(12) United States Patent
Mao

(10) Patent No.: US 8,720,683 B2
(45) Date of Patent: May 13, 2014

(54) PROTECTIVE SHELL APPLICABLE TO A HANDHELD ELECTRIC APPARATUS

(71) Applicant: Ozaki International Co., Ltd., New Taipei (TW)

(72) Inventor: Tzu Jen Mao, New Taipei (TW)

(73) Assignee: Ozaki International Co., Ltd., New Taipei (TW)

( * ) Notice: Subject to any disclaimer, the term of this patent is extended or adjusted under 35 U.S.C. 154(b) by 0 days.

(21) Appl. No.: 13/902,522

(22) Filed: May 24, 2013

(65) Prior Publication Data

US 2014/0061087 A1 Mar. 6, 2014

(30) Foreign Application Priority Data

Sep. 5, 2012 (TW) .............................. 101217121 A

(51) Int. Cl.
*B65D 85/00* (2006.01)

(52) U.S. Cl.
USPC .......................................... 206/320; 206/457

(58) Field of Classification Search
USPC .......... 206/576, 320, 457, 459.5, 45.2, 45.23, 206/45.24, 701
See application file for complete search history.

(56) References Cited

U.S. PATENT DOCUMENTS

| | | | | |
|---|---|---|---|---|
| 5,305,538 | A * | 4/1994 | Kanzelberger | 40/616 |
| 7,775,355 | B1 * | 8/2010 | Hood | 206/320 |
| 8,264,310 | B2 * | 9/2012 | Lauder et al. | 335/219 |
| 8,567,596 | B1 * | 10/2013 | Mason, Jr. | 206/230 |
| 8,646,610 | B2 * | 2/2014 | Foght | 206/576 |
| 2010/0270189 | A1 * | 10/2010 | Pedersen et al. | 206/320 |
| 2011/0233078 | A1 | 9/2011 | Monaco et al. | |

* cited by examiner

Primary Examiner — Jacob K Ackun
(74) Attorney, Agent, or Firm — Muncy, Geissler, Olds & Lowe, P.C.

(57) ABSTRACT

A protective shell applicable to a handheld electric apparatus includes a back plate and a supporting plate. The back plate has a fixing portion and a first figure layer disposed opposite to the handheld electric apparatus. The supporting plate has a second figure layer, a connecting portion and a bendable portion. The second figure layer is disposed on the supporting plate. The connecting portion is disposed on the supporting plate for connecting with the fixing portion. The bendable portion is disposed on the supporting plate. In a first state, the supporting plate is provided to shield the first figure layer and the second figure layer is revealed to form a first expression figure. In a second state, the bendable portion is bent to reveal the first figure layer, so that the first figure layer and the supporting plate are combined to form a second expression figure.

16 Claims, 9 Drawing Sheets

PROTECTIVE SHELL APPLICABLE TO A HANDHELD ELECTRIC APPARATUS

BACKGROUND OF THE INVENTION

1. Technical Field

The present invention is related to a protective shell, and more particularly to a protective shell applicable to a handheld electric apparatus.

2. Related Art

Thanks to the developments and improvements of technologies, different kinds of handheld electric apparatuses, such as mobile phones, personal digital assistants (PDAs), tablet personal computers (tablet PCs), electronic book readers (e-book readers), and so forth, are invented and become necessity items for most people in daily life. In order to prevent the handheld electric apparatus from being crashed by foreign objects, a user would assemble a protective case out of his/her handheld electric apparatus, so that the outer casing of the handheld electric apparatus would not be damaged because of the protection of the protective case.

Also, thanks to the well-developed technologies, the handheld electric apparatuses become multifunctional, and more and more people use the handheld electric apparatuses to play multimedia. In order to watch the Multimedia comfortably, the user usually needs a supporting frame for standing the handheld electric apparatus on a flat surface.

However, in order to be securely assembled with the handheld electric apparatus and prevent the handheld electric apparatus from falling off, either the protective case or the supporting frame are designed according to the outline of the handheld electric apparatus; therefore, the user can only assemble the handheld electric apparatus with the protective case or the supporting frame in one time; once the user needs to assemble the supporting frame with the handheld electric apparatus, the user has to depart the handheld electric apparatus from the protective case at first for the further assembling of the supporting frame, so it is very inconvenient for the user.

Further, as shown in FIG. 1 which is an illustrative figure of a protecting case 100 shown in an US publication patent (publication number 2011/0233078 A1), shows an example in which the protective case 100 has a supporting frame 110. The protective case 100 has a protecting function and the supporting function; however, when the user takes or holds the handheld electric apparatus 200, the user would unintentionally expand out the supporting frame 110 easily because the supporting frame 110 is protruding out of the back face of the protective case 100. In addition, the protruding-out supporting frame 110 neither makes the handheld electric apparatus be lay on a surface stably, nor satisfies the aesthetic perception for the user.

SUMMARY

In view of this, the present invention proposes a protective shell applicable to a handheld electric apparatus which includes a back plate and a supporting plate. The back plate is assembled with one side of the handheld electric apparatus and comprises a fixing portion and a first figure layer. The first figure layer and the supporting plate are disposed at one side of the back plate which is opposite to the handheld electric apparatus. The supporting plate includes a second figure layer, a connecting portion and bendable portion. The second figure layer is disposed at one side of the supporting plate which is opposite to the back plate. The connecting portion is disposed at one end of the supporting plate for connecting with the fixing portion. The bendable portion is disposed at another end of the supporting plate. When the protective shell is in a first state, the supporting plate shields the first figure layer and the second figure layer is revealed to form a first expression figure. When the protective shell is in a second state, the bendable portion is bent by an external force and bends toward a direction opposite to the back plate so as to reveal the first figure layer, so that the first figure layer and the supporting plate are combined to form a second expression figure.

In one embodiment, the protective shell further has a protruding rib, disposed at another side of the supporting plate which is adjacent to the back plate and disposed along an axial axis passing through the connecting portion and the bendable portion. Therefore, when the bendable portion is pressed, the protruding rib abuts against the back plate for bending the bendable portion toward a direction opposite to the back plate.

In one embodiment, the protruding rib is disposed in a middle part of the supporting plate.

In one embodiment, the protruding rib and the supporting plate are integrated as one piece.

In one embodiment, the supporting plate is formed as longitudinally arc shaped along the axial axis, and the surface of another side of the supporting plate is a recessed surface.

In one embodiment, the supporting plate is formed as an elongated shape, the connecting portion and the bendable portion are disposed at two ends of the long axis of the supporting plate respectively.

In one embodiment, the first figure layer has an oral expression region corresponding to the connection between the bendable portion and fixing portion.

In one embodiment, the first expression figure or the second expression figure is a mouth-opened figure.

In one embodiment, the first expression figure or the second expression figure is a mouth-closed figure.

In one embodiment, the supporting plate has a third figure layer disposed at another side of the supporting plate which is adjacent to the back plate.

In one embodiment, the back plate has a fourth figure layer disposed opposite to the handheld electric apparatus and corresponding to the supporting plate so as to be combined with the second figure layer for forming the first expression figure, wherein the fourth figure layer comprises two ophthalmic regions disposed thereon adjacent to two sides of the supporting plate respectively.

In one embodiment, the back plate has an opening and a film. The opening is disposed corresponding to the supporting plate. The first figure layer is disposed on the film. The film is pasted onto the handheld electric apparatus, so that the first figure layer corresponds to the opening for revealing the first figure layer in the second state via the opening.

In one embodiment, the protective shell has a sidewall frame extruded from a periphery of the back plate, such that the sidewall frame and the back plate form a receiving space for receiving the handheld electric apparatus. Wherein, the sidewall frame and the casing of the handheld electric apparatus are engaged with each other via a separable manner.

In one embodiment, the protective shell has a front plate for forming a chamber with the back plate so as to protect the handheld electric apparatus.

Based on the above, the protective shell applicable to a handheld electric apparatus according to the present invention not only provides a protecting function and a supporting function for the handheld electric apparatus, but also keeps the flatness of the back side of the protective shell, maintains the entire aesthetic perception of the handheld electric apparatus and the protective shell, and improves the stability of the handheld electric apparatus upon laying on a surface. Furthermore, via adjusting the supporting plate in the two operation states, two different expression figures can be performed for enhancing interestingness.

The detailed features and advantages of the present invention are described below in great detail through the following embodiments, the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
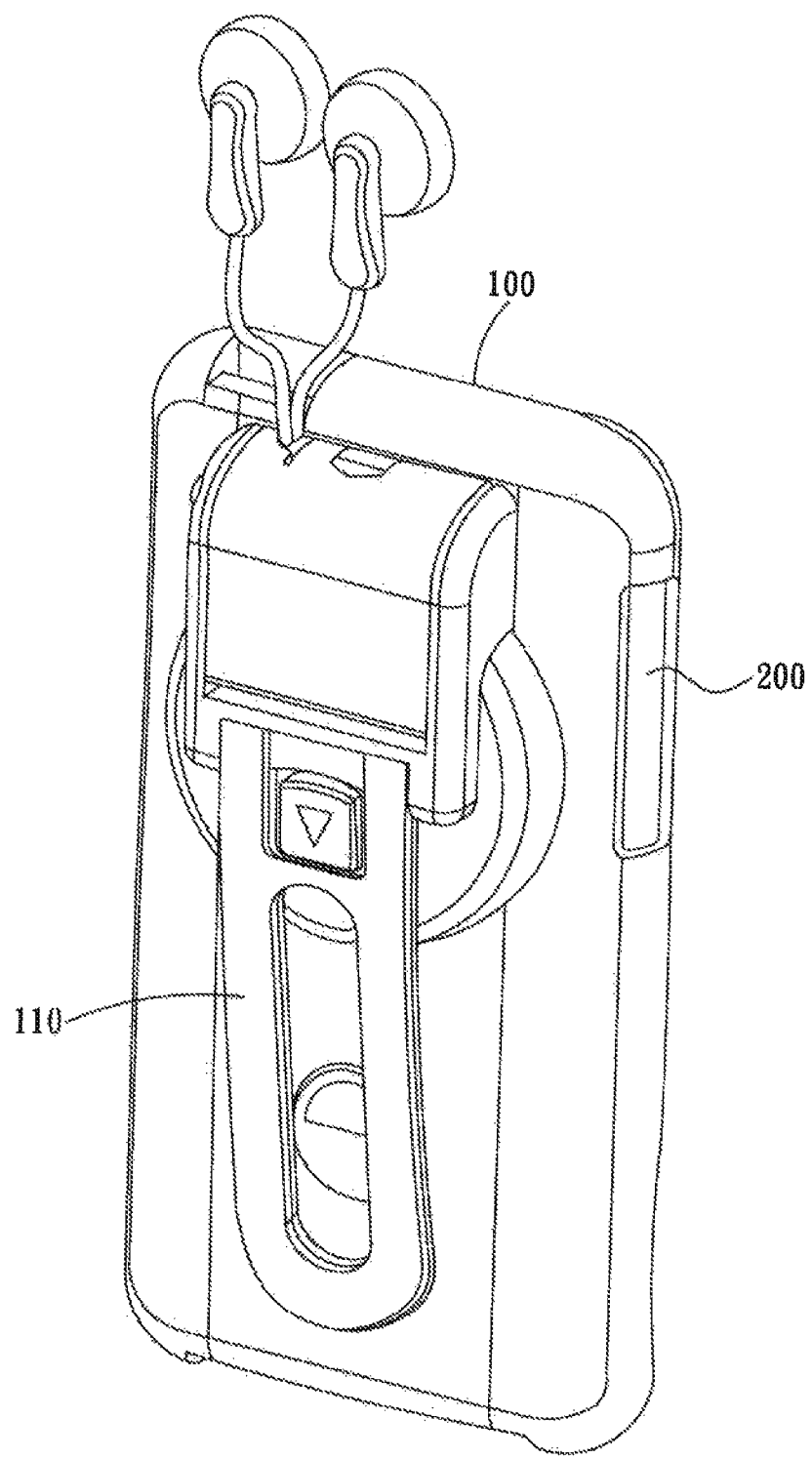
FIG. 1 is a schematic view of a protective shell of an US publication patent (publication number 2011/0233078)
Figure 2A:
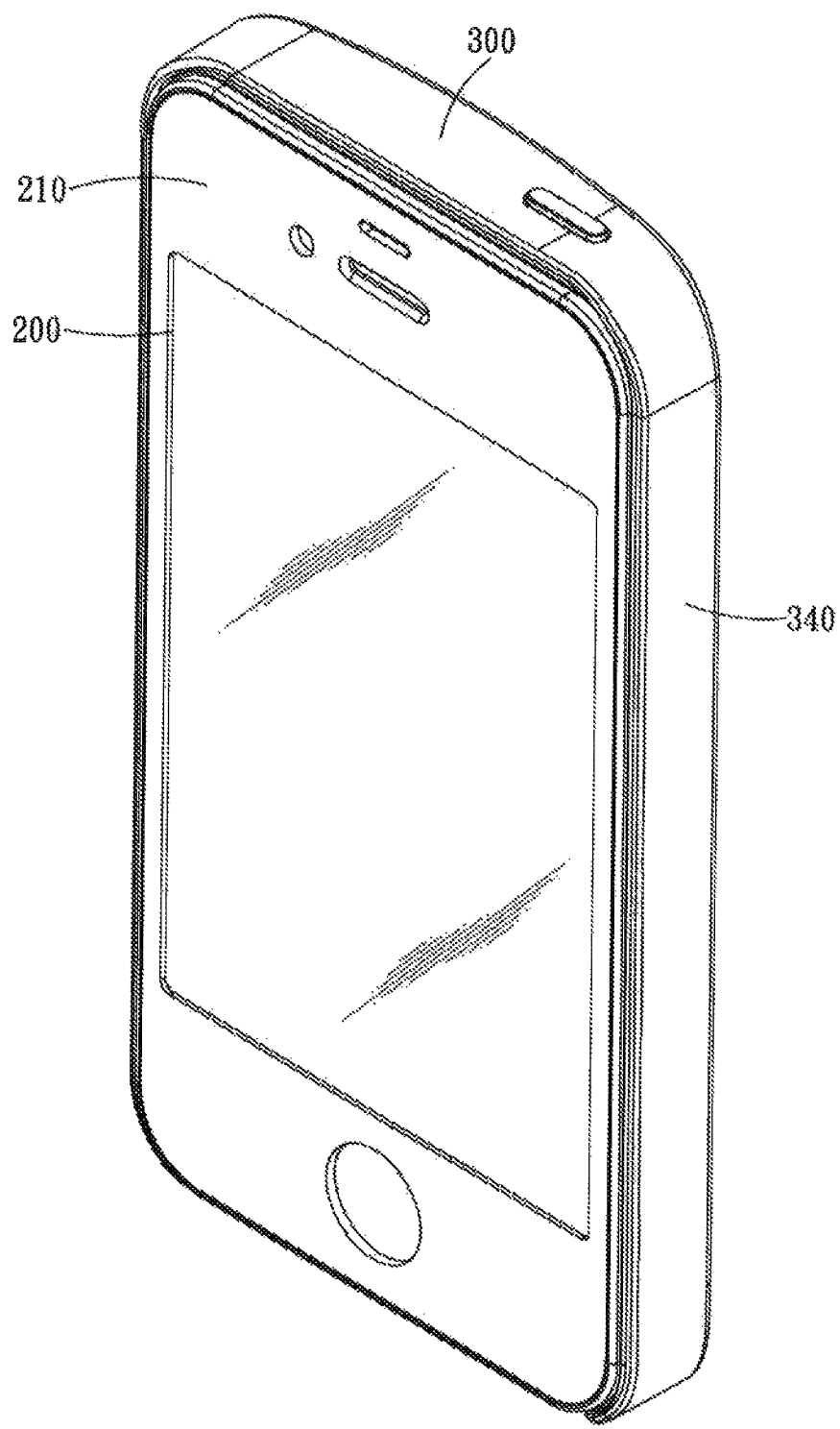
FIG. 2A is a schematic three-dimensional view (1) of a protective shell applicable to a handheld electric apparatus of a first embodiment according to the present invention where the protective shell is in a first state.
Figure 2B:
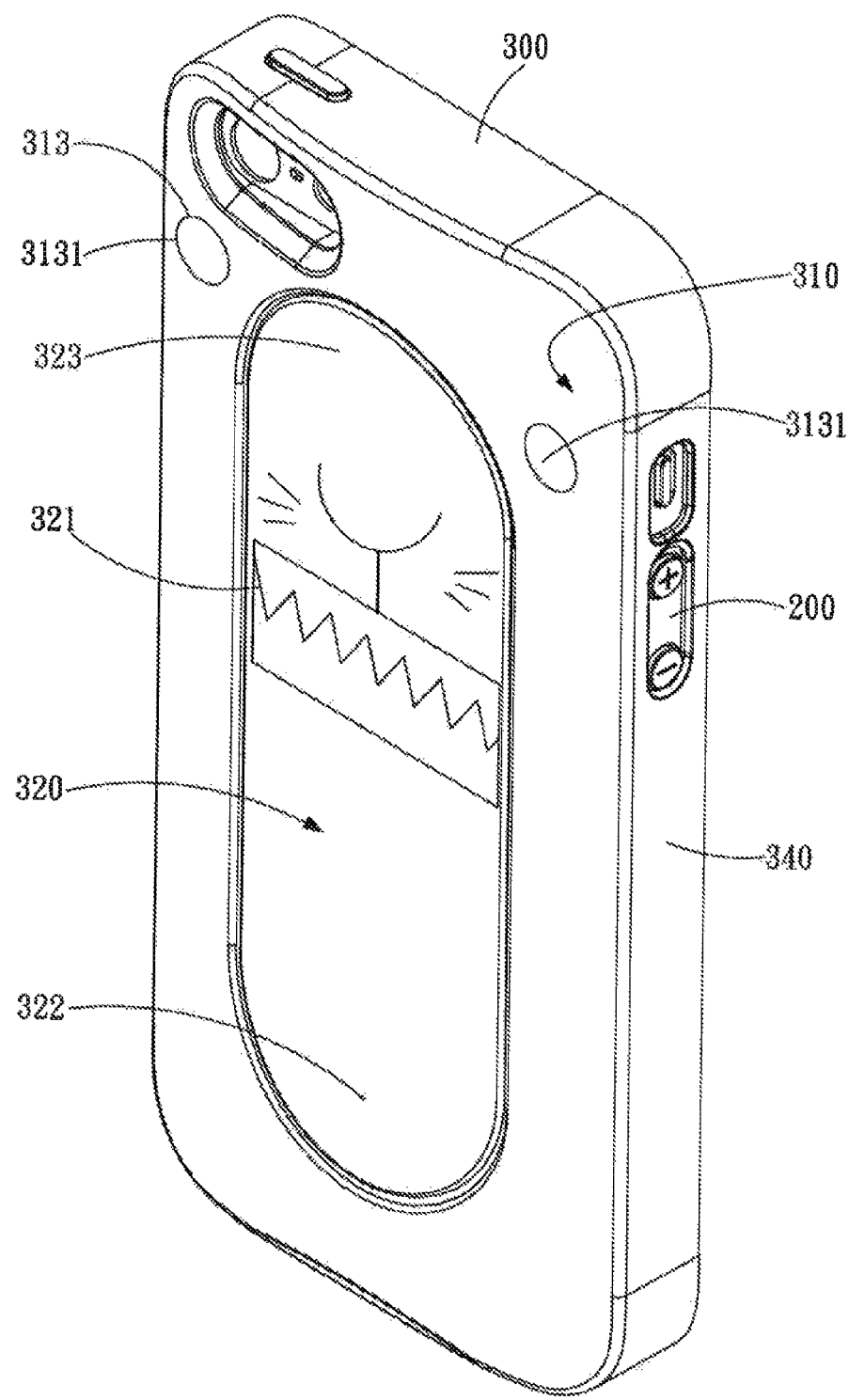
FIG. 2B is a schematic three-dimensional view (2) of the protective shell applicable to a handheld electric apparatus of the first embodiment according to the present invention wherein the protective shell is in the first state.
Figure 3:
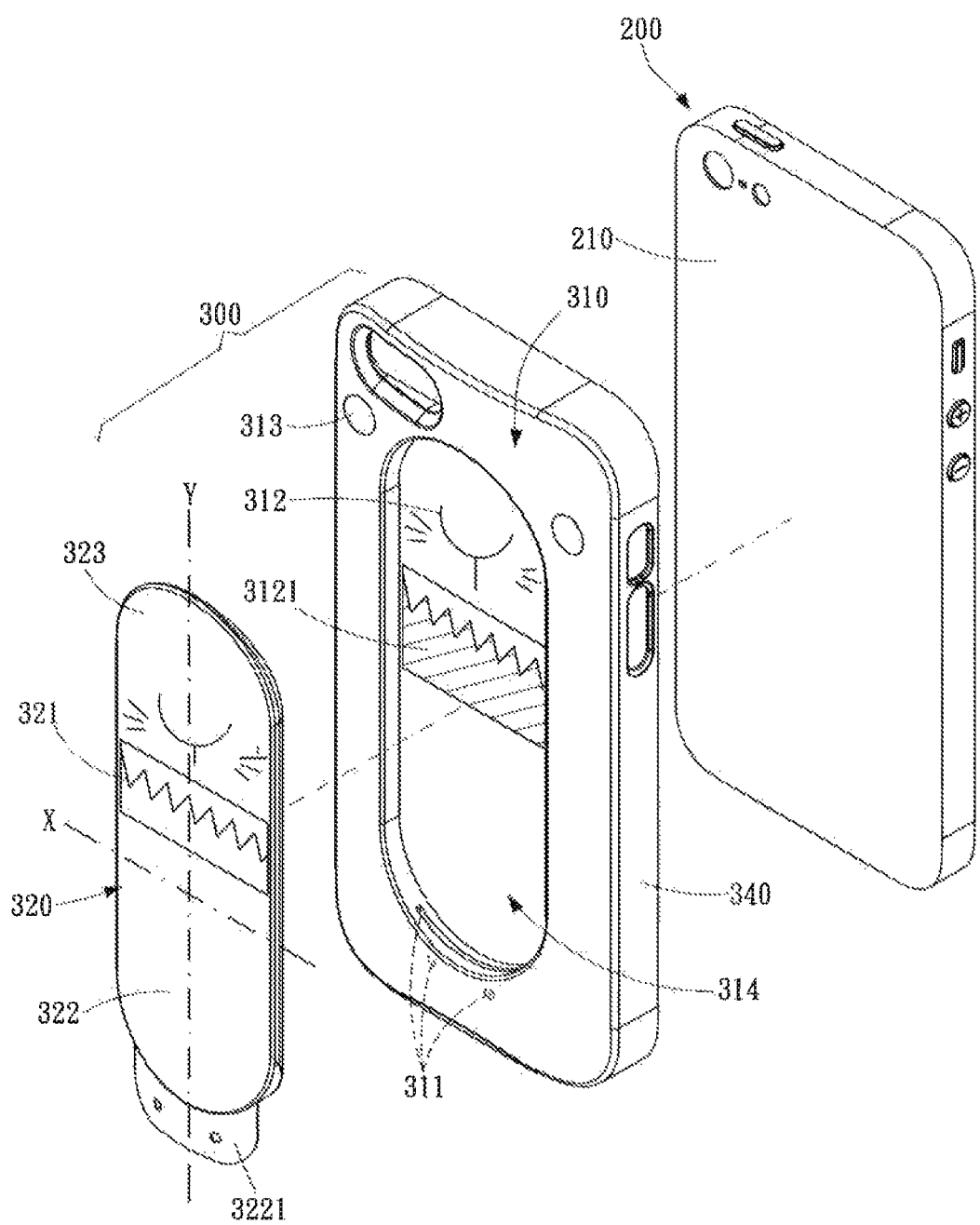
FIG. 3 is an exploded view of the protective shell applicable to a handheld electric apparatus of the first embodiment according to the present invention wherein the protective shell is in the first state.

FIG. 2A is a schematic three-dimensional view (1) of a protective shell 300 applicable to a handheld electric apparatus 200 of a first embodiment according to the present invention which is in a first state. FIG. 2B is a schematic three-dimensional view (2) of the protective shell 300 applicable to a handheld electric apparatus 200 of the first embodiment according to the present invention which is in the first state. FIG. 3 is an exploded view of the protective shell 300 applicable to a handheld electric apparatus 200 of the first embodiment according to the present invention which is in the first state.

In the first embodiment of the present invention, the protective shell 300 is essentially a protective case for assembling onto the casing 210 of the handheld electric apparatus 200.

Referring to FIG. 2A, FIG. 2B and FIG. 3, the protective shell 300 applicable to a handheld electric apparatus 200 is assembled to one side of the handheld electric apparatus 200. The protective shell 300 has a back plate 310 and a supporting plate 320. The back plate 310 is assembled with one side of the handheld electric apparatus 200 and has a fixing portion 311 and a first figure layer 312. The first figure layer 312 and the supporting plate 320 are disposed at one side of the back plate 310 which is opposite to the handheld electric apparatus 200. The supporting plate 320 has a second figure layer 321, a connecting portion 322 and a bendable portion 323. The second figure layer 321 is disposed at one side of the supporting plate 320 which is opposite to the back plate 310. The connecting portion 322 is disposed at one end of the supporting plate 320 for connecting with the fixing portion 311. The bendable portion 323 is disposed at another end of the supporting plate 320. Based on this, the connecting portion 322 is near to the lower end of the handheld electric apparatus 200, and the bendable portion 323 is near to the upper end of the hand electric apparatus 200.

As shown in FIG. 3, in some implementation aspects, the connecting portion 322 has a connecting plate 3221 which is extended from the supporting plate 320 and has a connecting mechanism corresponding to the fixing portion 311 for securely connecting with the fixing portion 311. In some implementation aspects, the fixing portion 311 may be securely connected with the connecting portion 322 by means of engaging, buckling, gluing, thermal bonding, and so forth.

Figure 4A:
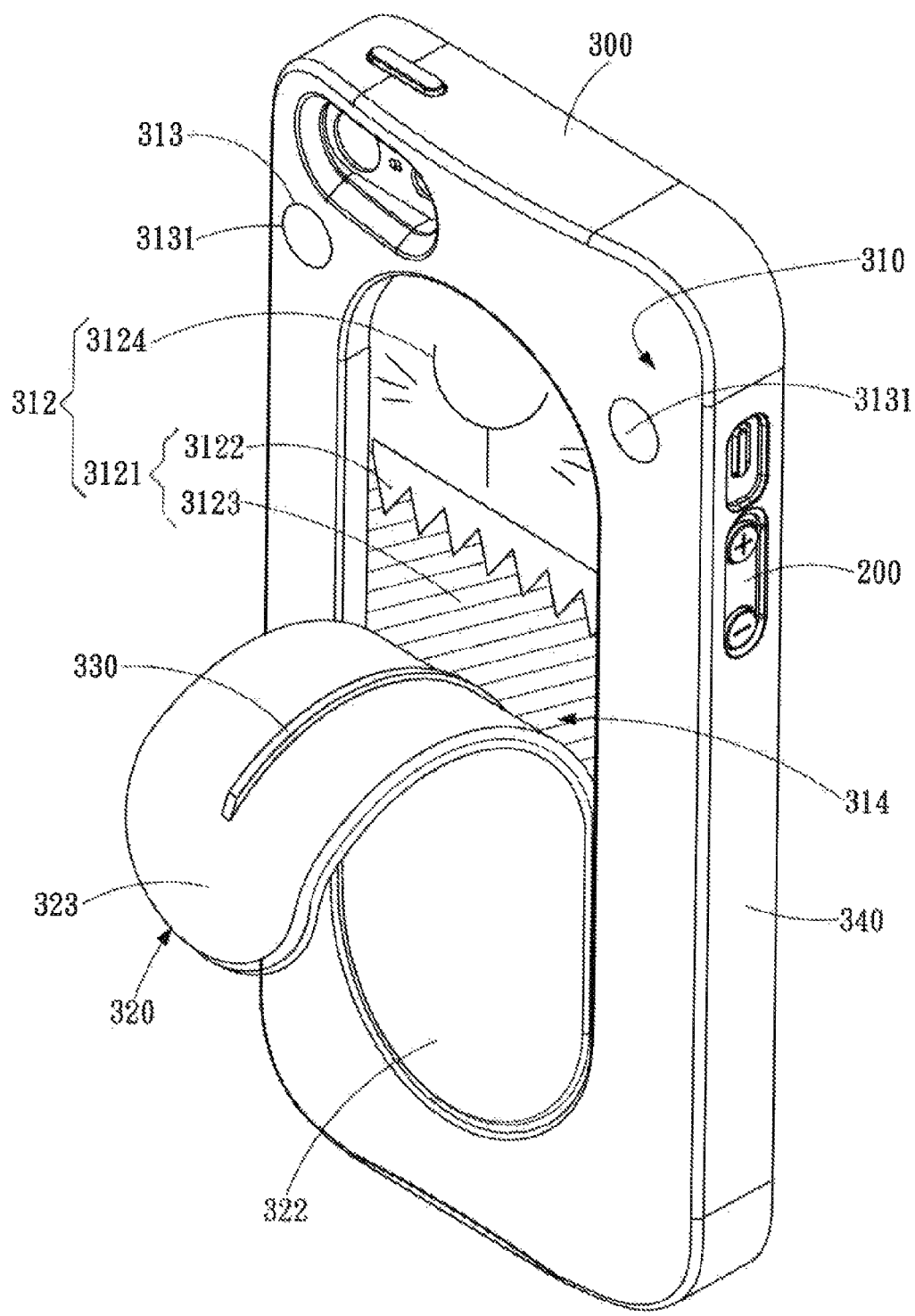
FIG. 4A is a schematic three-dimensional view of the protective shell applicable to a handheld electric apparatus of the first embodiment according to the present invention wherein the protective shell is in a second state.

FIG. 4A is a schematic three-dimensional view of the protective shell 309 applicable to a handheld electric apparatus 200 of the first embodiment according to the present invention wherein the protective shell 300 is in a second state;

Referring to FIG. 2B and FIG. 4A, when the protective shell 300 is in a first state, the supporting plate 320 shields the first figure layer 312 and the second figure layer 321 is revealed to form a first expression figure. When the protective shell 300 is in a second state, the bendable portion 323 is bent by an external force and bends toward a direction opposite to the back plate 320 so as to reveal the first figure layer 312, so that the first figure layer 312 and the supporting plate 320 are combined to form a second expression figure. That is to say, the protective shell 300 has two states upon operation; in the first state, the supporting plate 320 is flatted (as shown in FIG. 2B); while in the second state, the supporting plate 320 is bent out of the protective shell 300 and formed as a bent-shaped (as shown in FIG. 4A). The first expression figure and the second expression figure are essentially facial expressions of human beings, personified animals or plants. Based on this, the protective shell 300 provides different visual effects and interestingness by selectively presenting the first expression figure and the second expression figure via adjusting the supporting plate 320.

Based on this, as shown in FIG. 3, a surface area of the supporting plate 320 is larger than another surface area of the first figure layer 312, so that the supporting plate 320 shields the first figure layer 312 in the first state to reveal the second figure layer 321. The supporting plate 320 is manufactured by two roll laminating procedures; in one roll laminating procedure, the roller is applied to one side of the supporting plate 320 which is opposite to the back plate 310 along an axial axis Y which passing through the connecting portion 322 and the bendable portion 323; while in another roll laminating procedure, the roller is applied to another side of the supporting plate 320 which is adjacent to the back plate 310 along an axial axis X which is perpendicular to the axial axis Y. Therefore, the supporting plate 320 is formed as longitudinally arc shaped along the axial axis Y, and the surface of another side of the supporting plate 320 is a recessed surface.

In some implementation aspects, the supporting plate 320 is formed as an elongated shape, wherein the connecting portion 322 and the bendable portion 323 are disposed at two ends of the long axis of the supporting plate 320 (the axial axis Y) respectively.

In some implementation aspects, the edge of another end of the supporting plate 320 may be circular arced. However, the embodiments of the present invention are not limited thereto, and the edge of another end of the supporting plate 320 may be branched so as to mimic a snake's tongue.

In some implementation aspects, the first figure layer 312 has an oral expression region 3121 which corresponds to the connection between the bendable portion 323 and fixing portion 311. Therefore, the supporting plate 320 acts as a tongue in the second expression figure and cooperates with the oral expression region 3121. That is to say, the second expression figure shows a figure with the tongue sticking out; via alternating the oral expression region 3121, the second expression figure may be a mouth-opened figure (as shown in FIG. 4A) or a mouth-closed figure (as shown in FIG. 4B), FIG. 4B is another schematic three-dimensional view of the protective shell 300 applicable to a handheld electric apparatus 200 of the first embodiment according to the present invention wherein the protective shell 300 is in the second state.

As shown in FIG. 4A, the oral expression region 3121 may have but not be limited to a dental region 3122 and an oral cavity region 3123. The dental region 3122 is disposed at an upper part of the oral cavity region 3123, and the supporting plate 320 is opposite to the dental region 3122 and disposed at a lower part of the oral cavity region 3123, so that a figure in which the mouth is opened with the tongue sticking out is provided.

Figure 4B:
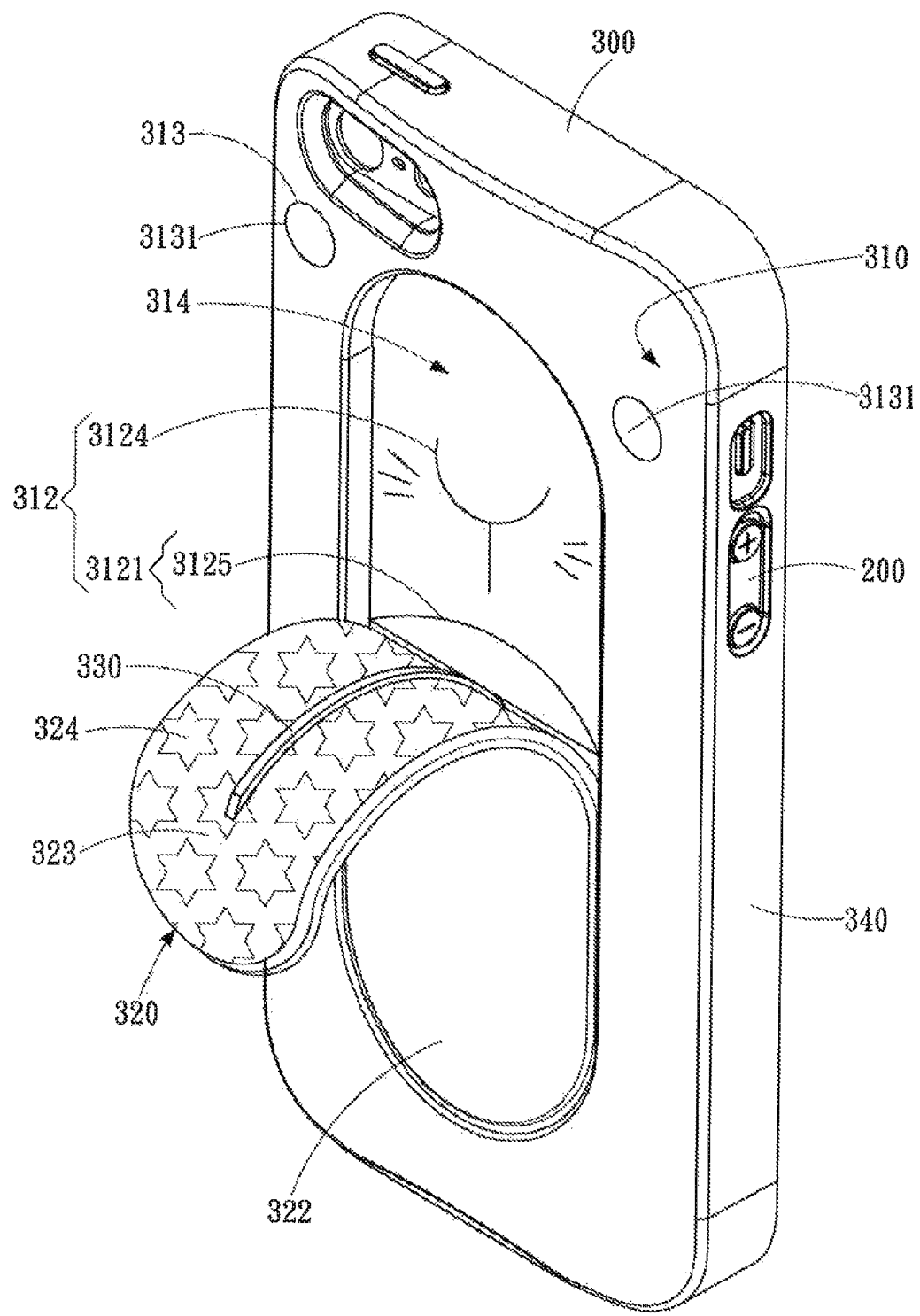
FIG. 4B is another schematic three-dimensional view of the protective shell applicable to a handheld electric apparatus of the first embodiment according to the present invention wherein the protective shell is in the second state.

As shown in FIG. 4B, the oral expression region 3121 may have but not limited to a labia portion 3125 or the dental region 3122 but does not have the oral cavity region 3123. Based on this, the labia region 3125 (or the dental region 3122) are closely attached to the connection between the bendable portion 323 and the fixing portion 311 so as to form a figure in which the mouth is closed with the tongue sticking out.

In some implementation aspects, the first figure layer 312 further has a nasal region 3124 for showing a nasal figure.

Similar to the second expression figure, the first expression figure also can be a mouth-opened figure (not shown) or a mouth-closed figure (as shown in FIG. 2B) and may have but not limited to the dental region 3122, the oral cavity region 3123, the nasal region 3124 and/or the labia region 3125.

In some implementation aspects, as shown in FIG. 4B, the supporting plate 320 further has a third figure layer 324 disposed at another side thereof which is adjacent to the back plate 310. Based on this, when the protective shell 300 is in the second state, the supporting plate 320 is bent to reveal the third figure layer 324, so that the first figure layer 312, the third figure layer 324 and the supporting plate 320 are combined to form the second expression figure. Based on this, the third figure layer 324 may be patterned as round spotted, starred, striped or so forth. However, the embodiments of the present invention are not limited thereto, the third figure layer 324 may also be provided by covering the supporting plate 320, and the first figure layer 312 may show a color different to that of the supporting plate 320.

In some implementation aspects, as shown in FIG. 2B, the back plate 310 further has a fourth figure layer 313 disposed opposite to the handheld electric apparatus 200 and corresponding to the supporting plate 320 so as to be combined with the second figure layer 321 for forming the first expression figure.

In some implementation aspects, the fourth figure layer 313 has two ophthalmic regions 3131 disposed thereon adjacent to two sides of the supporting plate 320 respectively. That is to say, the two ophthalmic regions 3131 are respectively disposed at two sides of the long axis of the supporting plate 320 (the axial axis Y) and near to the bendable portion 323.

In some implementation aspects, as shown in FIGS. 4A and 4B, the protective shell 300 further has a protruding rib 330. The protruding rib 330 is disposed at another side of the supporting plate 320 which is adjacent to the back plate 310 and disposed along the axial axis Y which passes through the connecting portion 322 and the bendable portion 323, so that when the bendable portion 323 is pressed, the protruding rib 330 abuts against the back plate 310 for bending the bendable portion 323 toward a direction opposite to the back plate 310 (namely, the bendable portion 323 is bent outward the protective shell 300).

In some implementation aspects, the protruding rib 330 is disposed in a middle part of the supporting plate 320; therefore, when another end of the supporting plate 320 which is near to the bendable portion 323 is pressed, another end of the supporting plate 320 slightly moves to the back plate 310, so that the protruding rib 330 abuts against the back plate 310.

In some implementation aspects, the protruding rib 330 and the supporting plate 320 are integrated as one piece which is manufactured by plastic injection molding techniques.

In some implementation aspects, as shown in FIG. 2B and FIG. 3, the back plate 310 further has a recessed portion 314 corresponding to the supporting plate 320, so that the supporting plate 320 fills up the recessed portion 314 at the first state. Based on this, the protective shell 300 is typically in the first state which has a flat back side for stably laying the handheld electric apparatus 200 assembled with the protective shell 300.

In some implementation aspects, as shown in FIG. 3, the protective shell 300 further has a sidewall frame 340 extruded from a periphery of the back plate 310, such that the sidewall frame 340 and the back plate 310 form a receiving space for receiving the handheld electric apparatus 200. The sidewall frame 340 and the casing 210 are engaged with each other via a separable manner; the back plate 310 is closely attached to the casing 210 of the handheld electric apparatus 200.

Figure 5:
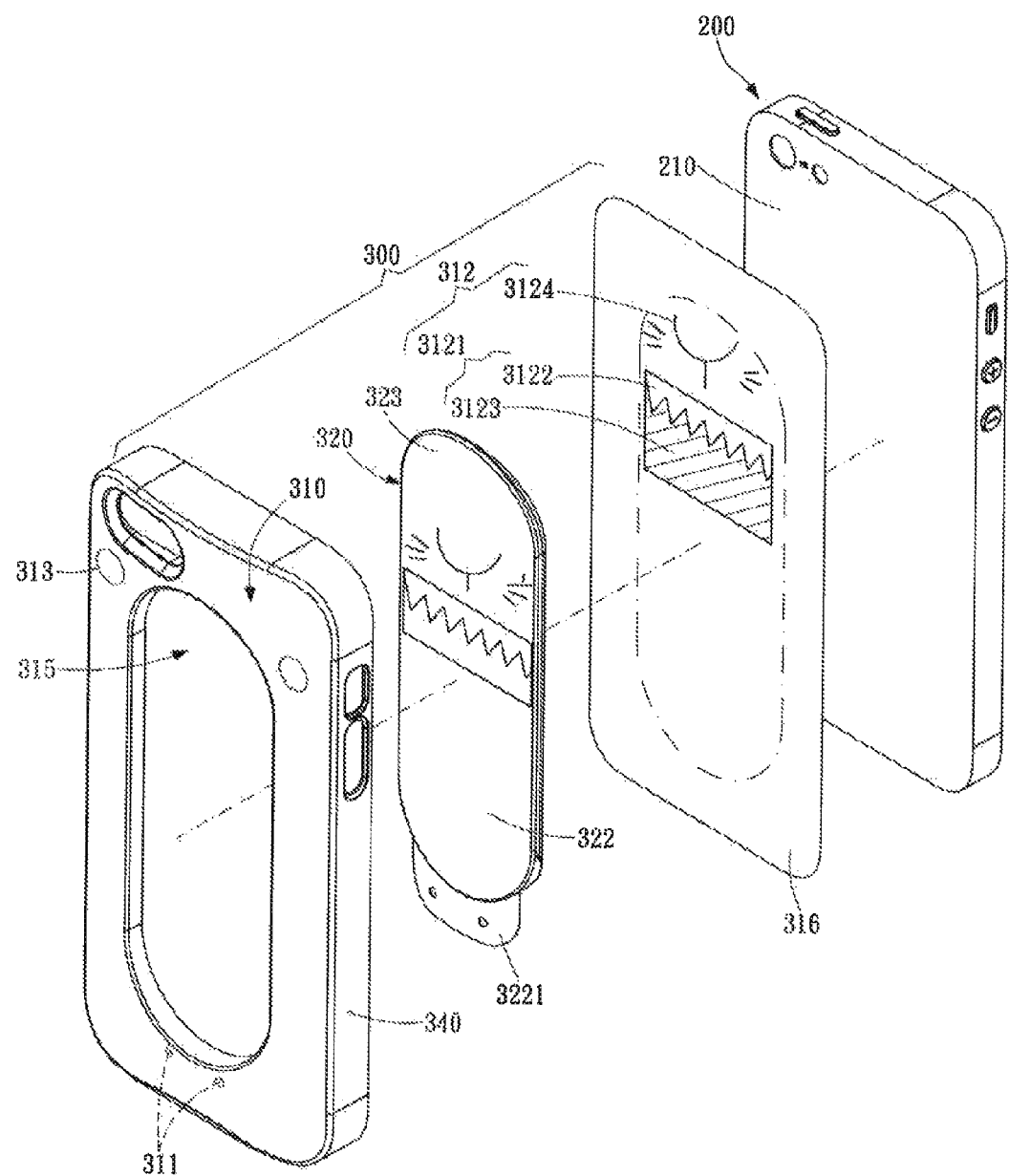
FIG. 5 is an exploded view of a protective shell applicable to a handheld electric apparatus of a second embodiment according to the present invention wherein the protective shell is in the second state.

FIG. 5 is an exploded view of a protective shell 300 applicable to a handheld electric apparatus 200 of a second embodiment according to the present invention wherein the protective shell 300 is in the second state.

As shown in FIG. 5, the protective, shell 300 of the second embodiment is approximately the same as that of the first embodiment, except that the back plate 310 further has an opening 315 and a film 316 in the second embodiment.

The opening 315 is disposed corresponding to the supporting plate 320. The first figure layer 312 is disposed on the film 316. The film 316 is pasted onto the handheld electric apparatus 200, so that the first figure layer 312 corresponds to the opening 315 for revealing the first figure layer 312 in the second state via the opening 315. Based on this, the shape and the size of the film 316 are approximately equal to those of the back plate 310; moreover, since the film 316 has the first figure layer 312 in one face and a gluing layer in another face, the film 316 is vulgarly referred to as the protecting sticker.

In some implementation aspects, the size and the shape of the film 316 approximately correspond to the three dimensional Outline of the handheld electric apparatus 200, namely, the film 316 corresponds to the six developed faces of the handheld electric apparatus 200. The film 316 has the first figure layer 312 in one face and a gluing layer in another face. That is to say, the film 316 is vulgarly referred to as the protecting film in essence for covering the casing 210 of the handheld electric apparatus 200.

In some implementation aspects, the periphery of the opening 315 corresponds to the recessed portion 314 (or the supporting plate 320).

Figure 6:
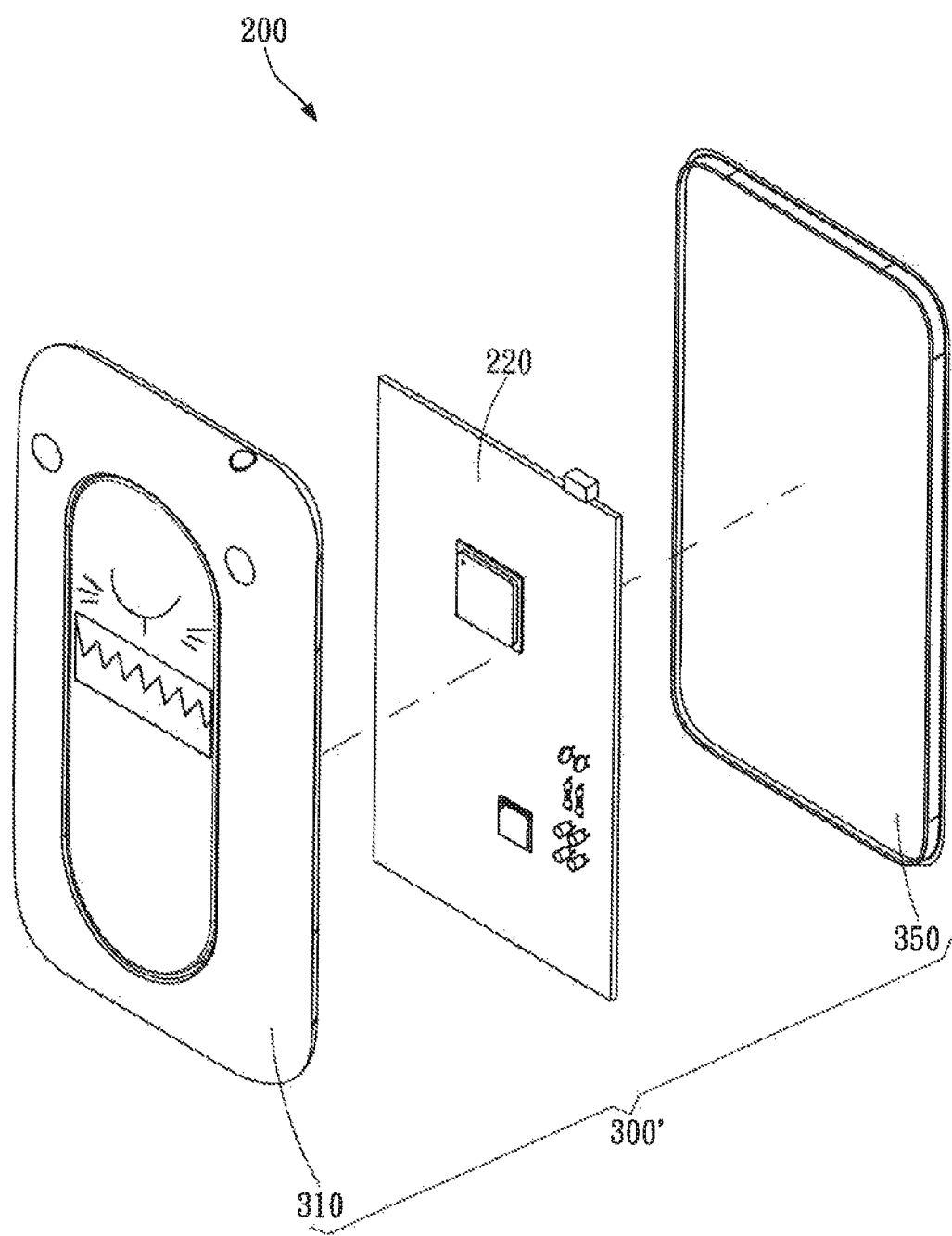
FIG. 6 is an exploded view of a protective shell applicable to a handheld electric apparatus of a third embodiment according to the present invention wherein the protective shell is in the second state.

FIG. 6 is an exploded view of a protective shell 300' applicable to a handheld electric apparatus 200 of a third embodiment according to the present invention wherein the protective shell 300' is in the second state.

As shown in FIG. 6, the protective shell 300' of the third embodiment is approximately the same as that of the first embodiment or the second embodiment, except that the protective shell 300' is essentially the casing 210 of the handheld electric apparatus 200 in the third embodiment. The protective shell 300' further has a front plate 350 for forming a chamber with the back plate 310 so as to protect the circuit component 220 of the handheld electric apparatus 200. Based on this, both the front plate 350 and the back plate 310 have buckling structures corresponding to each other, so that the front plate 350 is assembled with the back plate 310 for forming the protective shell 300'.

Figure 7:
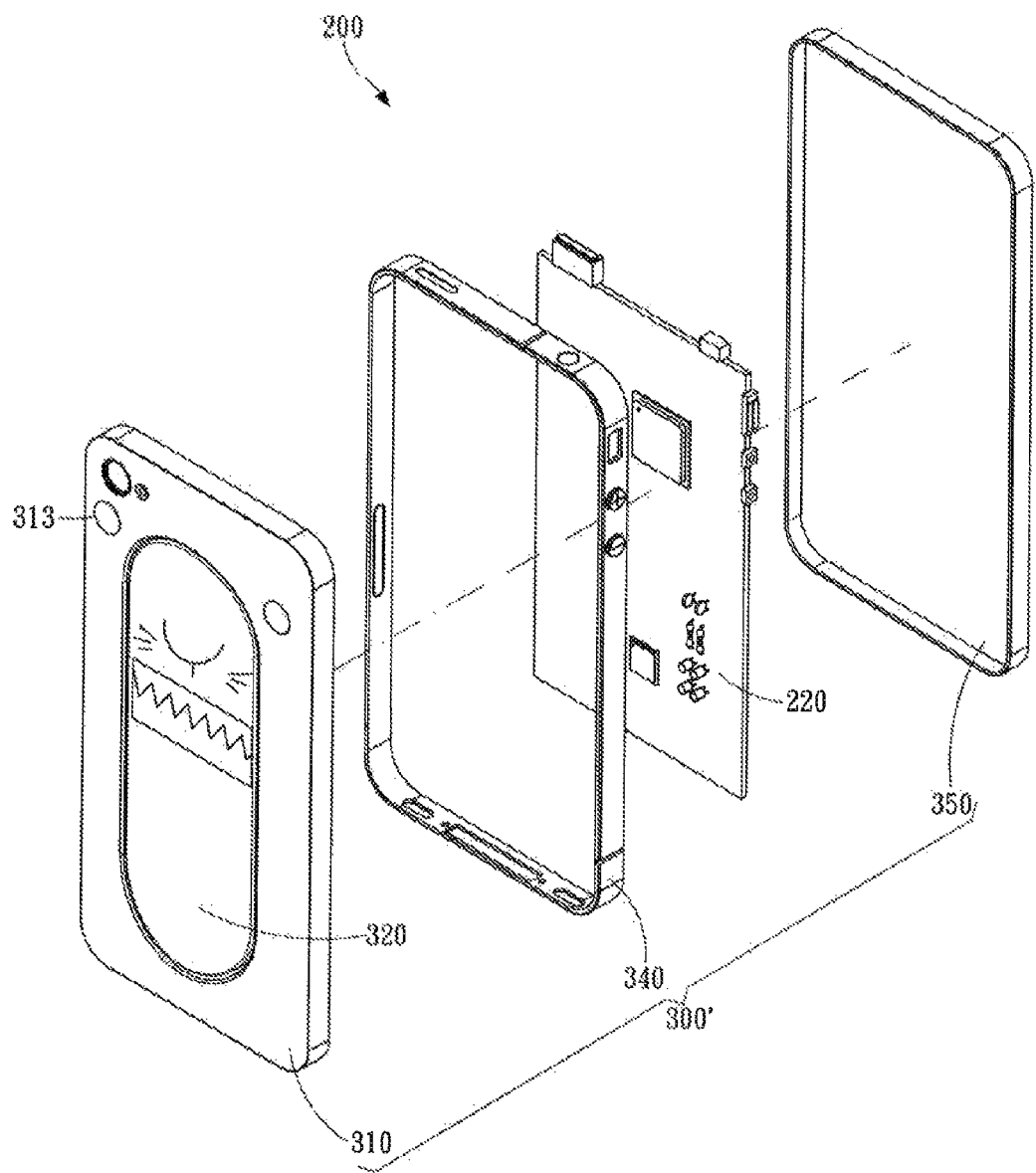
FIG. 7 is another exploded view of the protective shell applicable to a handheld electric apparatus of the third embodiment according to the present invention wherein the protective shell is in the second state.

FIG. 7 is another exploded view of the protective shell 300' applicable to a handheld electric apparatus 200 of the third embodiment according to the present invention wherein the protective shell 300' is in the second state.

In some implementation aspects, as shown in FIG. 7, the protective shell 300' has the front plate 350, the back plate 310 and the sidewall frame 340 so as to form a chamber for protecting the circuit component 220 of the handheld electric apparatus 200. Based on this, the sidewall frame 340 has buckling structures respectively corresponding to the front plate 350 and the back plate 310, so that the front plate 350, the sidewall frame 340 and the back plate 310 are assembled with each other for forming the protective shell 300'.

Herein, the handheld electric apparatuses 200 shown in FIGS. 2A-7 are only as illustrative examples but not limited thereto, and the handheld electric apparatus 200 may also has partially curved surfaces, arc lined surfaces or other designs. On another aspect, the outlines of the protective shells 300, 300' may also be adjusted according to the outline of the handheld electric apparatus 200.

Based on the above, the protective shell 300, 300' applicable to a handheld electric apparatus 200 according to the present invention not only provides a protecting function and a supporting function for the handheld electric apparatus 200, but also keeps the flatness of the back side of the protective shell 300, 300', maintains the entire aesthetic perception of the handheld electric apparatus 200 and the protective shell 300, 300', and improves the stability of the handheld electric apparatus 200 upon laying on a surface. Furthermore, via adjusting the supporting plate 320 in the two operation states, two different expression figures can be performed for enhancing interestingness.

What is claimed is:

1. A protective shell applicable to a handheld electric apparatus, comprising:
a back plate, assembled with one side of the handheld electric apparatus, comprising a fixing portion and a first figure layer, the first figure layer being disposed at one side of the back plate which is opposite to the handheld electric apparatus; and
a supporting plate, disposed at one side of the back plate which is opposite to the handheld electric apparatus, comprising:
a second figure layer, being disposed at one side of the supporting plate which is opposite to the back plate;
a connecting portion, disposed at one end of the supporting plate for connecting with the fixing portion; and
a bendable portion, disposed at another end of the supporting plate, the supporting plate shields the first figure layer and the second figure layer is revealed to form a first expression figure when the protective shell is in a first state, and the bendable portion is bent by an external force and bends toward a direction opposite to the back plate so as to reveal the first figure layer, so that the first figure layer and the supporting plate are combined to form a second expression figure when the protective shell is in a second state.

2. The protective shell applicable to a handheld electric apparatus according to claim 1, wherein the protective shell further comprises a protruding rib, the protruding rib is disposed at another side of the supporting plate which is adjacent to the back plate and disposed along an axial axis passing through the connecting portion and the bendable portion, so that when the bendable portion is pressed, the protruding rib abuts against the back plate for bending the bendable portion toward a direction opposite to the back plate.

3. The protective shell applicable to a handheld electric apparatus according to claim 2, wherein the protruding rib is disposed in a middle part of the supporting plate.

4. The protective shell applicable to a handheld electric apparatus according to claim 2, wherein the protruding rib and the supporting plate are integrated as one piece.

5. The protective shell applicable to a handheld electric apparatus according to claim 1, wherein the supporting plate is formed as longitudinally arc shaped along the axial axis, and the surface of another side of the supporting plate is a recessed surface.

6. The protective shell applicable to a handheld electric apparatus according to claim 1, wherein the supporting plate is formed as an elongated shape, the connecting portion and the bendable portion are disposed at two ends of the long axis of the supporting plate respectively.

7. The protective shell applicable to a handheld electric apparatus according to claim 1, wherein the supporting plate comprises a third figure layer disposed at another side of the supporting plate which is adjacent to the back plate.

8. The protective shell applicable to a handheld electric apparatus according to claim 1, wherein the first figure layer comprises an oral expression region corresponding to the connection between the bendable portion and fixing portion.

9. The protective shell applicable to a handheld electric apparatus according to claim 1, wherein the back plate comprises a fourth figure layer disposed opposite to the handheld electric apparatus and corresponding to the supporting plate so as to be combined with the second figure layer for forming the first expression figure.

10. The protective shell applicable to a handheld electric apparatus according to claim 9, wherein the fourth figure layer comprises two ophthalmic regions disposed thereon adjacent to two sides of the supporting plate respectively.

11. The protective shell applicable to a handheld electric apparatus according to claim 1, wherein the first expression figure or the second expression figure is a mouth-opened figure.

12. The protective shell applicable to a handheld electric apparatus according to claim 1, wherein the first expression figure or the second expression figure is a mouth-closed figure.

13. The protective shell applicable to a handheld electric apparatus according to claim 1, wherein the back plate comprises a recessed portion corresponding to the supporting plate, so that the supporting plate fills up the recessed portion at the first state.

14. The protective shell applicable to a handheld electric apparatus according to claim 1, wherein the back plate comprising:
- an opening, disposed corresponding to the supporting plate; and
- a film, the first figure layer being disposed on the film, the film being used to be pasted onto the handheld electric apparatus, so that the first figure layer corresponds to the opening for revealing the first figure layer in the second state via the opening.

15. The protective shell applicable to a handheld electric apparatus according to claim 1, wherein the handheld electric apparatus comprises a casing, comprising:
- a sidewall frame, extruded from a periphery of the back plate, such that the sidewall frame and the back plate form a receiving space for receiving the handheld electric apparatus, wherein the sidewall frame and the casing are engaged with each other via a separable manner.

16. The protective shell applicable to a handheld electric apparatus according to claim 1, wherein the protective shell comprises a front plate for forming a chamber with the back plate so as to protect the handheld electric apparatus.

* * * * *